United States Patent Office 3,365,891
Patented Jan. 30, 1968

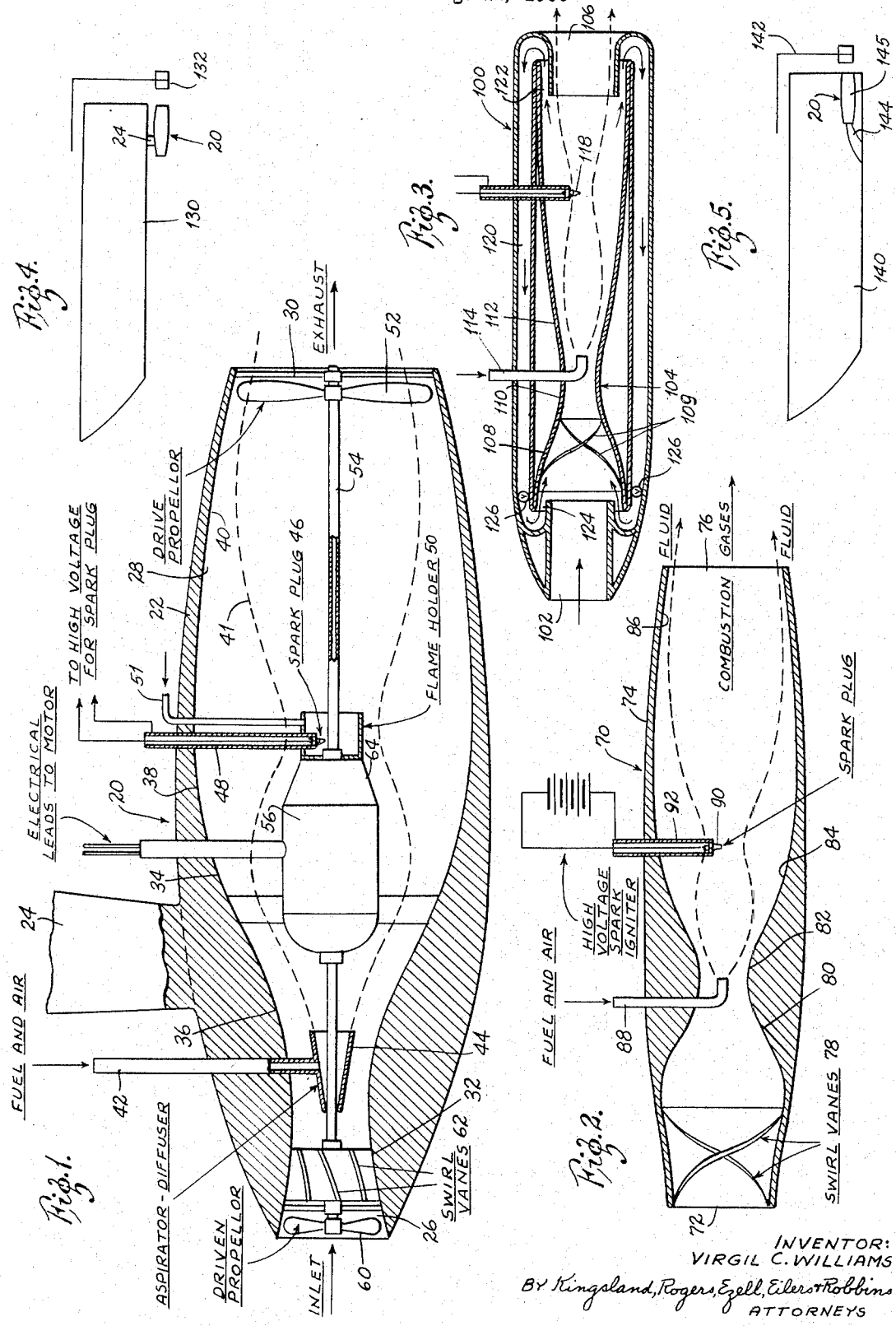

3,365,891
GAS THRUSTOR MARINE ENGINE
Virgil C. Williams, St. Louis, Mo., assignor of one-twentieth to John M. Peterson, St. Louis, Mo.
Filed Aug. 22, 1966, Ser. No. 573,987
17 Claims. (Cl. 60—221)

This invention relates to improvements in marine engines and in particular is concerned with a marine engine having a nozzle provided with a converging and expanded diverging section connected to a slowly converging section, with means for burning gases within the nozzle to provide power.

By means of this invention there has been provided an improved marine engine which has means for receiving water at its inlet, maintaining within a nozzle a swirling water region on the peripheral interior wall of the nozzle chamber, and an inner combustion region for the propagation and conversion of energy of combustion of gases into useful thrust for propulsion of water at increased velocity from the engine. Although the primary application of the invention is described as a marine engine, it will be understood that the engine may be affixed to stationary support and used as a pump or means of moving a fluid.

In particular, the engine of this invention is provided with a nozzle having a converging inlet with means for receiving the water under pressure and forcing it in a swirling action against the walls of the nozzle through a restricted throat section into a diverging section to an area that is larger than the inlet to reduce the velocity of the water passing therethrough. At the end of the diverging section, a gradually converging section is provided, and at the juncture of the aforementioned two sections ignition means, such as a spark plug, is provided to burn a fuel and air mixture to provide a rapidly expanding combustion gas, which provides thrust power through the outlet of the engine. The peripheral swirl action of the water through the engine provides a heat insulation or heat protection means also to protect the body of the engine from the heat of the exhaust gases. Further, means are provided for starting the engine through an auxiliary motor connecting a drive propeller at the rear of the engine with a driven propeller at the inlet to force the water through the inlet opening and impart motion to the water at the start up of operation. A control feature is also provided through means for recycling a selected part of the water adjacent the outlet of the engine back to the inlet to provide control for the engine output from full engine output to a condition approaching what amounts to a neutral or no-power condition for the engine.

The above features are objects of this invention and other objects will appear in the detailed description which follows and will be otherwise apparent to those skilled in the art.

For the purpose of illustration of this invention, there is shown in the accompanying drawings a preferred embodiment and modifications of the invention. It will be understood that these drawings are for the purpose of illustration only, however, and that the invention is not limited thereto.

In the drawings:

FIGURE 1 is a view in partial vertical section through the axis of the marine engine and showing a preferred embodiment thereof;

FIGURE 2 is a view in vertical section of a simplified modification of the marine engine;

FIGURE 3 is a view in vertical section of another modification of the marine engine showing means for recycling the water to provide for throttling or control of the output of the engine;

FIGURE 4 is a schematic view in side elevation of a boat equipped with the marine engine of this invention used as an outboard; and FIGURE 5 is a schematic view in side elevation of a modification of the marine engine with a boat showing the engine used as an inboard.

In FIGURE 1 the marine engine is generally identified by the reference numeral 20 and is shown as being comprised of a housing 22 having a vertical support 24 adapted to be connected to the bottom of a vessel. The engine is provided with an inlet 26 and a nozzle 28 communicating with a power output outlet 30.

The nozzle 28 has a passage connecting the inlet with the outlet having a generally convergent, divergent and convergent configuration comprised of an inlet convergent section 32, connected to a divergent section 34 by intermediate restricter or throat section 36. The divergent section 34 has an extended section 38, which diverges at a gradually decreasing angle, and is connected to the rear convergent section 40, which converges at a relatively small angle to connect with the outlet 30.

Fuel and air are introduced into the throat section 36 through an inlet conduit 42 connected to an aspirator diffuser indicated by the reference numeral 44. The divergent shape of the aspirator diffuser generally promotes or is symmetrical with the divergent shape of the forward portion of the divergent section 34 as appears in the drawing.

An ignition means is provided through a spark plug 46, which is shielded by a conduit 48 housing electrical leads connected to a high voltage source. The spark plug is housed within a flame holder 50, which is closed at the forward end and opens to the rear. The flame holder provides for communication of the spark plug with the fuel and air mixture in an eddy region to ignite the fuel and air mixture in a low velocity region, and to hold flame in the engine. For rapid acceleration, means for injecting fuel directly into the flame holder may be provided by fuel line 51. Fuel so provided enriches the normal running mixture provided through line 42.

A drive propeller 52 is positioned in the outlet 30 of the engine. The propeller has a diameter slightly less than the diameter of the outlet to provide an annular region through which water may pass. The drive propeller is connected by a shaft 54 through a motor 56 to a driven propeller 60 positioned within the inlet. Fixed swirl vanes 62 are provided to insure a swirling motion to the water as it passes through the nozzle and to throw it against the outer periphery of the nozzle chamber. The swirl vanes 62 may also be rotatable in which case they are driven by the motor drive shaft to impart the swirling action. The driven propeller 60 acts as a pump to force the water through the inlet and into the restrictor or throat section 36. The shaft 54 may be hollow in its entirety from inlet to exhaust to allow the passage of water for cooling purposes to protect the shaft from the heat of the hot combustion gases.

The motor 56 is further provided with a converging rear portion 64, which connects with the flame holder, which aids in the provision of a central region of diverging or increasing area to reduce the velocity of the fuel and air passing to the spark plug for ignition. Instead of using a motor with leads passing into the nozzle it will be understood that an external field may be employed around the periphery of the nozzle.

In FIGURE 2 a simplified modification of the marine engine is provided and which is generally identified by the reference numeral 70. This engine is provided with an inlet 72 and a nozzle 74 communicating with an outlet 76. The inlet is provided with stationary swirl vanes 78 which impart a swirling motion to water as it passes therethrough to pass it against the sides of the nozzle chamber and to the convergent section 80. The convergent section 80 is connected by a restrictor or throat section 82 with a divergent section 84, which in turn is connected with a rear gently converging section 86. A fuel and air conduit 88 feeds the combustible mixture to the throat section 82 in the same manner as provided in FIGURE 1. A spark plug 90 is likewise provided, in the same fashion as FIGURE 1, and is connected to a conduit 92 housing leads connected to a high voltage source.

A further modification is shown in FIGURE 3 provided for control of the engine output and to adjust the speed and power of the device. This engine is generally identified by the reference numeral 100, and is provided with an inlet 102 communicating through the nozzle, generally identified by the reference numeral 104, with an outlet 106. The inlet 102 has a cylindrically-shaped opening communicating with the convergent section 108, containing swirl vanes 109, which in turn communicates through the throat 110 with the divergent section 112. The outlet opening 106 is likewise comprised of a cylindrical opening and has a smaller diameter than the rear portion of the divergent section to provide a restricted opening which acts in a similar fashion to the convergent openings of the embodiments of FIGURES 1 and 2. A fuel and air mixture is introduced by the L-shaped conduit 114, while a spark plug 118 provides for ignition.

In the embodiment of FIGURE 3, the means for controlling the engine output is provided through a recycle passageway 120, which runs along the exterior of the nozzle and has an annular inlet opening 122 on the outside of the outlet opening 106 to recycle a selected part of the fluid passing through the nozzle back through the passageway 120 and to a recycle outlet opening 124, which is positioned in an outer annular relationship with the inlet opening 102. Valve means 126 are provided in the recycle passageway 120 to modulate or control the amount of fluid recycled back into the forward portion of the nozzle. When the valves 126 are closed, the engine will operate at full speed and power, and when they are fully opened, the fluid recycled will be at the maximum to provide a minimum of engine output approaching a neutral condition for the engine.

In FIGURE 4 the engine of this invention in any of its forms is shown applied as an outboard outside the boat. The boat, generally identified by the reference numeral 130, is provided with a rudder 132 and the engine, which, for the purpose of example, is identified with the reference numeral 20 in the form of FIGURE 1, although it will be undrstood that the forms of FIGURES 2 and 3 may also be employed. It will also be understood that where desired the engine, instead of being permanently mounted in the fashion shown in FIGURE 4 through the strut 24, may be pivoted about a vertical axis to act both as a power and steering mechanism where the rudder 132 may be obviated. The engine may also be pivoted about a transverse horizontal axis 145 with a resultant change in direction of thrust to achieve desirable planing qualities for any particular design and loading of the boat.

In the modification of FIGURE 5, the engine of this invention is shown used as an inboard. Here a boat 140 is provided with a rudder 142, and the engine, here again for the purpose of example identified by the reference numeral 20, is shown located within the bottom of the boat. A passageway 144 communicates with the bottom of the boat and provides for passage of water into the inlet opening of the engine, while the outlet opening is open to the rear of the boat. The engine may be permanently mounted within the bottom of the boat, or means may be provided for rotating it about a vertical axis so that the outlet opening is rotated to provide a thrust at different angles to effect the steering of the boat whereby the rudder can be obviated, or, alternatively, the rudder 142 may be positioned within the exhaust jet of water and gases and may be used to deflect the direction of the jet, thus changing the effective thrust angle and effecting the steering action. Since the engine is a thrust device, the exhaust need not be underwater or below the water line.

Operation

The engine in the preferred embodiment of FIGURE 1 is operated by first starting the motor 56, which acts as a start-up device. The motor will cause the driven propeller 60 to pump water through the nozzle and cause the water in passing through the swirl vanes to hug or be thrown against the outside of the nozzle chamber sections. The drive propeller will also aid in causing the water as it is expelled through the outlet to hug the outer periphery of the outlet portion of the nozzle through centrifugal force. In the convergent section 32 the water accelerates and its pressure falls thus permitting aspiration of a fuel and air mixture. The fuel and air mixture, when it is introduced into the engine, is confined within the void provided and shown by the dotted lines, and is ignited by the spark plug 46. The ignition of the fuel and air mixture provides a high velocity flame which provides a thrust to the engine. This high velocity thrust effect of the burning gases further drives the drive propeller 52 so that after start-up of the engine the motor may be de-energized and the shaft connecting the drive propeller to the driven propeller will drive the driven propeller 60 to insure the maintenance of the swirling effect upon the water passing through the nozzle, and to insure the holding of the void within the nozzle for the passage of the combustion gases.

The combustion gases move at a high velocity and, due to this high velocity which exceeds the flame propagation rate, will not burn in the section between the fuel and air aspirator diffuser device and the spark plugs. The path of the fuel and air mixture between the aspirator diffuser and the spark plugs is indicated by the dotted line in the void region 37. The fuel and air mixture being light will not mix with the swirling liquid water, which is thrown by centrifugal force against the sides of the nozzle as it moves to the rear. Thus, an uncontaminated fuel and air mixture is provided when it is moved to the area of the spark plugs. The spark plug ignites the fuel and air mixture and the rapidly expanding combustion gases follow the path indicated by the dotted line 41 in the gradually converging rear section of the nozzle. There is a combined thrus effect due to the combustion gases expanding against the water in the engine as they move out the outlet, and also from the high velocity water expelled around the periphery of the drive propeller 52.

A flame is held during the operation in flame holder 50, since the flame holder provides a region for reception of eddy gases and maintenance of the flame due to the low velocity in this area. Thus, any tendency to blow out the flame by the high velocity combustion gases and through the effect of the swirling water on the outside periphery of the combustion gas region at the rear of the nozzle is avoided. For rapid acceleration, means for injecting fuel directly into the flame holder may be provided by fuel line 51. Fuel so provided enriches the normal running mixture provided through line 42.

In the modification of FIGURE 2, a simplified embodiment of the marine engine is provided. In this modification the engine is first started through imparting motion to it, which can be accomplished by either rowing or pushing the boat to which the engine is attached or providing an auxiliary engine. Once motion has been imparted, the engine may be started. Water enters the inlet 72 and is given a swirling motion, such that the water is thrown around the periphery of the nozzle chamber in the inlet convergent section 80. A fuel and air mixture is introduced through the conduit 88 and is aspirated due to the converging section 80 accelerating the water and thus reducing its pressure causing the fuel and air mixture to flow to the L-shaped structure of the fuel conduit in the region shown in the dotted lines. The fuel and air mixture is then ignited at the end of the divergent section 84 by the spark plug 90. There is no flame in the region between the fuel and air conduit and the spark plug, since the velocity is above that required for flame propagation. As the diverging section develops, however, and due to the placement of the spark plug at a point where the diverging section has expanded to its greater diameter, the velocity slows down and a relative compression is effected to the point where ignition of the fuel and air mixture takes place. The combustion gases then exhaust and provide a thrust effect in the generally slightly converging rear section 86 of the nozzle. The water is expelled around the outer periphery of the combustion gas region in the same fashion as the device of FIGURE 1.

The modification of FIGURE 3 shows the means for controlling the engine output by recycling a controlled amount of the water passing through the nozzle. This device may be started in a similar fashion to that of the engine of FIGURE 2 by use of auxiliary power to impart motion. It will also be understood that the device may be used with the motor and drive and driven propellers, or rotary swirling vanes of the embodiment shown in FIGURE 1. In the engine of FIGURE 3, identified by the reference numeral 100, the engine, when the valves 126 are closed, operates in a similar fashion to the engine of FIGURE 2. Thus, water enters the inlet 102 and passes through the converging section 108 in increasing velocity and at lower pressure, and the fuel and air mixture is ignited in the same fashion as previously described, while the water is exhausted around the periphery of the combustion gas region to provide thrust for the engine. In this fashion the engine operates at full output. When it is desired to reduce the speed of the engine, the valves 126 may be partially opened and part of the water will pass through the recycle passage openings 122 and through the recycle passage 120, and then through the openings 124 back into the converging inlet section 108. The engine output is reduced by recycling the water in this fashion and when the valves are open all of the way a condition approaching neutral and minimal power output is obtained. In this fashion the enginge may be throttled and controlled to provide varying degrees of force and engine output through the manipulation of the valves 126.

The engines of the invention may be used as an outboard in the position shown in FIGURE 4, where, for purpose of example, the engine 20 is shown attached to the bottom of a boat provided with a conventional rudder 132. It will also be understood that the engine may be attached to the rear of the boat in any conventional fashion to provide thrust and power.

In the modification of FIGURE 5, the engine is shown located inside a boat wherein the inlet to the engine is connected by a passageway 144 to the bottom of the boat for passage of water through the engine and out to the rear to provide thrust. The rudder 142 is used to provide control, but it will be understood that the engine may be provided with means for pivoting it inside the boat, or for attaching the outlet end to a movable conduit, which can be directed from one side to the other to provide changes in direction of thrust to steer the boat and provide power at the same time, or by changing the transverse pivoting altitude to achieve desirable planing qualities for boat operation or loading distribution.

In the above description, the engine of this invention has been described as a marine engine for propelling vessels and boats. It will be understood, however, that the description of application for use as a marine engine where the engine moves with respect to a body of water can be reversed and that the engine may be used as a pump. Thus, it will be readily appreciated that the engine may be permanently mounted within a body of water, such as on a dock or on the wall of a container or the like, in which case the water will pass through the nozzle and may be propelled through the outlet opening in the conduit to provide a pumping action. It will also be readily appreciated that liquids other than water may be propelled through the nozzle to provide a pumping action.

Various other changes and modifications may be made within this invention as will be readily apparent to those skilled in the art. Such changes and modifications, such as modification for a pump, are within the scope and teaching of the marine engine specifically described, and are within the scope and teaching of the claims as appended hereto.

What is claimed is:

1. A marine engine adapted to be attached to a vessel, said engine comprising a housing having a front water inlet opening communicating through a nozzle with a rear outlet opening, said nozzle having a forward converging passage communicating with a medial diverging passage and a rear converging passage, means for introducing a combustible fluid adjacent the juncture of the forward converging passage and the medial diverging passage and ignition means located to the rear thereof.

2. The marine engine of claim 1 in which the medial diverging passage diverges to provide a cross-sectional opening substantially larger than the front inlet opening, and said outlet opening is substantially larger than the inlet opening.

3. The marine engine of claim 1 in which the inlet opening and forward passage are provided with means to impart a swirling motion to the water passing therethrough.

4. The marine engine of claim 1 in which the inlet opening and forward passage are provided with means to impart a swirling motion to the water passing therethrough and to force the water against the walls of the nozzle to provide heat insulation for said walls against the high temperature combustion gases.

5. The marine engine of claim 1 in which a drive propeller is provided adjacent the rear opening connected by a drive shaft to a driven propeller adjacent the inlet opening, said drive propeller being driven by the high velocity combustion gases and water exhausting through the rear opening and providing power to drive the driven propeller to pump water through the forward passage.

6. The marine engine of claim 5 in which said shaft has passage means for passing cooling water from an inlet opening at a front end of said shaft to an outlet opening at the rear end of said shaft to protect the shaft from the high temperature combustion gases.

7. The marine engine of claim 5 in which auxiliary power means are connected to the drive shaft to furnish power to the driven propeller.

8. The marine engine of claim 5 in which a motor is provided in one of the passages in the housing and is connected to the drive shaft to furnish power to the driven propeller.

9. The marine engine of claim 1 in which the marine engine is supported external to the vessel with both the front and rear openings being spaced external to the boat in free communication with the body of water in which the vessel is used.

10. The marine engine of claim 1 in which the marine engine is an inboard and the inlet opening of the engine communicates through a passage with the exterior of the vessel below the water line and the outlet opening communicates through another passage with the exterior of the vessel at a position to the rear of the inlet.

11. The marine engine of claim 1 and flame retaining means comprising a protective cover housing the ignition means, said cover having a rear opening for communication with the combustion gases.

12. The marine engine of claim 11 in which auxiliary means are provided for introducing a combustible fluid directly into the protective cover housing to provide increased acceleration to the engine.

13. The marine engine of claim 1 in which means are provided for controlling the output of the engine by recycling water from the outlet to the inlet portion of the engine.

14. The marine engine of claim 1 in which means are provided for controlling the output of the engine by recycling water from the outlet to the inlet portion of the engine, and valve means for controlling the output of the engine by varying the amount of water recycled.

15. The marine engine of claim 1 in which means are provided for controlling the output of the engine by recycling water from the outlet to the inlet portion of the engine through passage means having an opening at the water outlet, and said passage means extending forwardly along the nozzle and having a front opening communicating with the inlet portion of the engine.

16. The marine engine of claim 1 in which means are provided for controlling the output of the engine by recycling water from the outlet to the inlet portion of the engine through passage means having an opening at the water outlet, and said passage means extending forwardly along the nozzle and having a front opening communicating with the inlet portion of the engine, and valve means in said passage means for controlling the output of the engine by varying the amount of water recycled.

17. The marine engine of claim 1 in which the housing has means for pivoting to change the direction of thrust.

References Cited

UNITED STATES PATENTS

| | | | |
|---|---|---|---|
| 3,044,252 | 7/1962 | Zwicky | 60—221 |
| 3,157,992 | 11/1964 | Kemenczky | 115—13 X |
| 3,163,980 | 1/1965 | Turner | 60—221 |

CARLTON R. CROYLE, *Primary Examiner.*